(No Model.)
E. J. LEYBURN.
BOTTLE WASHING IMPLEMENT.
No. 337,595. Patented Mar. 9, 1886.
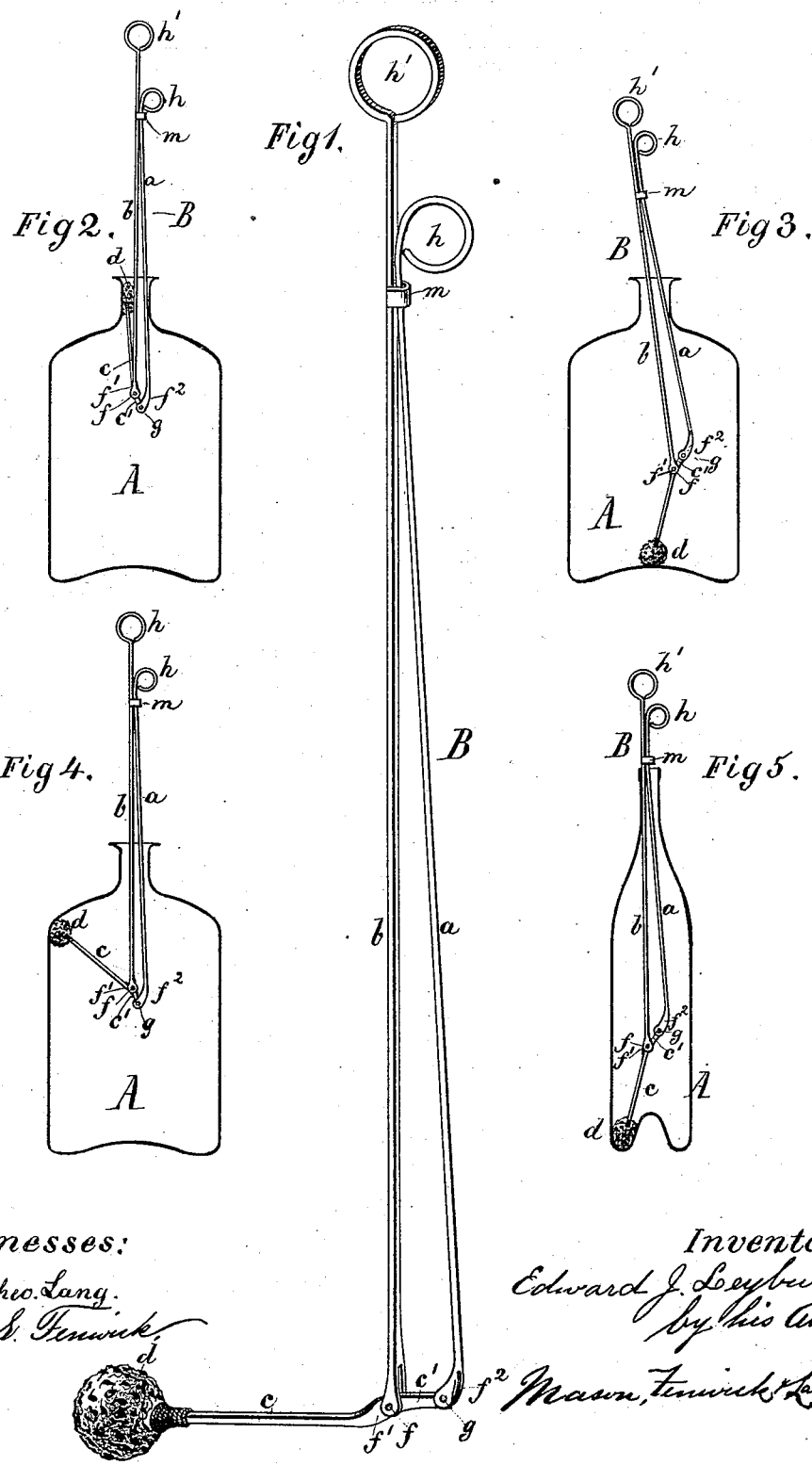
Witnesses:
J. P. Theo. Lang.
Robt. S. Fenwick.
Inventor:
Edward J. Leyburn
by his Attys
Mason, Fenwick & Lawrence

UNITED STATES PATENT OFFICE.

EDWARD J. LEYBURN, OF LEXINGTON, VIRGINIA.

BOTTLE-WASHING IMPLEMENT.

SPECIFICATION forming part of Letters Patent No. 337,595, dated March 9, 1886.

Application filed September 5, 1885. Serial No. 176,242. (No model.)

*To all whom it may concern:*

Be it known that I, EDWARD J. LEYBURN, a citizen of the United States, residing at Lexington, in the county of Rockbridge and State of Virginia, have invented certain new and useful Improvements in Bottle-Washing Implements; and I do hereby declare the following to be a full, clear, and exact description of the invention, such as will enable others skilled in the art to which it appertains to make and use the same.

My invention consists in certain constructions and combinations of parts, as will be hereinafter described and specifically claimed, whereby a bottle-washer is produced which can be made to accommodate itself to the bottom, inside shoulder, and neck of the bottle, and at the same time be simple in construction, effective in action, and of convenient manipulation.

In the drawings, Figure 1 is a perspective view of my improved bottle-washer. Fig. 2 shows the improved bottle-washer and a bottle, illustrating how the implement is made to accommodate itself to the neck of a bottle in order to enter and pass out of the same. Fig. 3 shows the bottle-washer and a bottle, illustrating how the implement is adjusted for washing the slightly-convex upper surface of the bottom of the bottle. Fig. 4 shows the bottle-washer and a bottle, illustrating how the implement is adjusted to fit the interior surface of the shoulders of the bottle; and Fig. 5 shows the bottle-washer and a bottle, illustrating how the implement is adjusted to fit into the deep valley around the interior surface of the conical bottom of the bottle.

In the accompanying drawings, A represents a bottle, and B the bottle-washer, comprising two long rods or bars, $a$ and $b$, and a short lever rod or bar, $c$, with a sponge or other suitable washing material, $d$, suitably secured on its free outer end by a cord or other means, as illustrated. The rod $b$ is somewhat longer than rod $a$, and it is pivoted at $f$ to the lever-rod $c$ at a cranked or bent portion, $f'$, thereof, while the rod $a$ is pivoted at $g$ to the short arm $c'$ of the lever-rod $c$, as shown.

The upper ends of the rods $a$ and $b$ are formed, respectively, with finger-loops $h\ h'$, or equivalent handles or finger projections, and the two rods are held close together just below their looped ends by a guide-strap, $m$, attached fast to rod $b$ and bowed around rod $a$.

For the purpose of having the implement fold into as narrow a compass as possible while entering the neck of the bottle for the purpose of washing the shoulders of bottles and for adjusting the implement to other different positions within the bottle, the lever-bar $c$ is cranked or bent at $f'$ and a slight curvature is made in the lower end of the rod $a$.

In washing large bottles and other portions, except the shoulders of small bottles, it is not necessary to fold the implement as shown in Fig. 2, as the implement can be readily inserted and withdrawn from a bottle when adjusted as in Fig. 3.

The within-described contrivance might be useful for cleaning lamp-chimneys and jugs, and in place of the sponge either a brush or a scraper might be found useful in some cases, the scraper or brush being interchangeable with the sponge.

What I claim is—

1. The bars $a$ and $b$, held and guided upon each other by a guide-strap, and pivoted, respectively, to the lever-bar $c$, one to the cranked or bent part and the other to the extremity of the short arm of said lever-bar, substantially as described.

2. The cranked lever-arm $c$, in combination with the looped bars $a$ and $b$ and guide-strap $m$, substantially as and for the purpose described.

In testimony whereof I affix my signature in presence of two witnesses.

EDWARD J. LEYBURN.

Witnesses:
 JOHN CARMICHAEL,
 G. W. PETTIGREW.